(12) United States Patent
Fushimi

(10) Patent No.: US 11,173,962 B2
(45) Date of Patent: Nov. 16, 2021

(54) TRACTOR HOOD LOCK UNIT

(71) Applicant: Yanmar Co., Ltd., Osaka (JP)

(72) Inventor: Shimpachi Fushimi, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 68 days.

(21) Appl. No.: 16/493,226

(22) PCT Filed: Feb. 26, 2018

(86) PCT No.: PCT/JP2018/007065
§ 371 (c)(1),
(2) Date: Sep. 11, 2019

(87) PCT Pub. No.: WO2018/168422
PCT Pub. Date: Sep. 20, 2018

(65) Prior Publication Data
US 2020/0062316 A1 Feb. 27, 2020

(30) Foreign Application Priority Data

Mar. 14, 2017 (JP) .............................. JP2017-048218

(51) Int. Cl.
*B62D 25/12* (2006.01)
*E05B 83/16* (2014.01)
*B62D 49/00* (2006.01)

(52) U.S. Cl.
CPC .............. *B62D 25/12* (2013.01); *B62D 49/00* (2013.01); *E05B 83/16* (2013.01)

(58) Field of Classification Search
CPC ......... B62D 25/12; B62D 25/10; E05B 83/16; E05B 83/24; E05B 85/00; E05B 79/12;
(Continued)

(56) References Cited

U.S. PATENT DOCUMENTS

2006/0082165 A1* 4/2006 Rose ...................... B60R 25/04
292/337
2007/0096498 A1* 5/2007 Kim ........................ E05B 77/36
296/76
(Continued)

FOREIGN PATENT DOCUMENTS

EP 2610147 A2 * 7/2013 ........... B60Q 1/0433
JP 8-026140 A 1/1996
(Continued)

OTHER PUBLICATIONS

International Search Report dated May 1, 2018 issued in corresponding PCT Application PCT/JP2018/007065 cites the patent documents above.

*Primary Examiner* — Steve Clemmons
(74) *Attorney, Agent, or Firm* — Norton Rose Fulbright US LLP

(57) ABSTRACT

A tractor including an engine hood, engine frames, a lock unit, an operation wire, and a cover member. The lock unit deters the engine hood from being opened. The operation wire is coupled to the lock unit, and is configured to allow unlocking of the lock unit through a release operation of its operable part. The operable part is arranged outward of the engine frames relative to a right-left direction and exposed to the exterior. The cover member covers the operation wire so as to disable manual operation of the operation wire, while allowing operation of the operation wire at least by using a predetermined release tool, the cover member having an opening portion shaped along a movement locus of the operable part of the operation wire.

20 Claims, 8 Drawing Sheets

(58) Field of Classification Search
CPC .......... E05B 79/04; E05B 79/02; E05B 77/44;
E05B 35/008; E05B 35/02; E05C 3/00;
E05C 3/12
See application file for complete search history.

(56) References Cited

U.S. PATENT DOCUMENTS

| | | | |
|---|---|---|---|
| 2008/0185873 A1* | 8/2008 | Ayabe ................ | E02F 9/00 |
| | | | 296/193.11 |
| 2011/0169281 A1* | 7/2011 | Bender ................ | E05B 83/16 |
| | | | 292/216 |
| 2013/0193697 A1* | 8/2013 | Spadoni ................ | E05B 83/36 |
| | | | 292/336.3 |
| 2016/0096426 A1* | 4/2016 | Kurokawa ................ | F01N 13/0097 |
| | | | 180/309 |

FOREIGN PATENT DOCUMENTS

| | | | |
|---|---|---|---|
| JP | 2011-255695 A1 | 12/2011 | |
| JP | 5427115 B2 * | 2/2014 | |
| JP | 5536696 B2 | 7/2014 | |
| JP | 2017-213923 A | 12/2017 | |

\* cited by examiner

TRACTOR HOOD LOCK UNIT

CROSS REFERENCES TO RELATED APPLICATIONS

This application is a national stage application pursuant to 35 U.S.C. § 371 of International Application No. PCT/JP2018/007065, filed on Feb. 26, 2018 which claims priority under 35 U.S.C. § 119 to Japanese Patent Application No. 2017-048218 filed on Mar. 14, 2017, the disclosures of which are hereby incorporated by reference in their entireties.

TECHNICAL FIELD

The present invention mainly relates to a tractor having a structure that deters its engine hood from being easily unlocked.

BACKGROUND ART

Traditionally, a tractor is provided with a lock unit that deters an engine hood from opening, and a release operation unit configured to release locking of the lock unit. Patent Literatures 1 and 2 (PLT 1, PLT 2) disclose a tractor of this type.

The tractor of PTL 1 has an operation unit (release operation unit) below its engine hood. By an operator manually pulling this operation unit, the engine hood is unlocked to be openable.

The tractor of PTL 2 has a release lever (release operation unit) in the interior of its engine hood. The engine hood is unlocked to be openable by an operator inserting a release member from below the engine hood to operate the release lever.

CITATION LIST

Patent Literatures

PTL 1: Japanese Patent Application Laid-Open No. 2011-255695

PTL 2: Japanese Patent No. 5536696

SUMMARY OF INVENTION

Technical Problem

Since the engine hood of the tractor of PTL 1 can be unlocked simply by manual operation, an unintended person can easily open the engine hood. Meanwhile, in the tractor of PTL 2, the lock is released by inserting the release member from the underneath of the engine hood into the interior of the engine hood. This requires the operator to perform the unlocking operation of the engine hood in a straining posture.

The present invention is made in view of the above circumstances, and it is a primary object of the present invention to provide a tractor having a structure that can deter an unintended person from easily unlocking the engine hood, while allowing the operator to unlock the engine hood in a non-straining posture.

Solution to Problem and Advantages

Problems to be solved by the invention are as described above, and next, means for solving the problems and effects thereof will be described.

In an aspect of the present invention, a tractor having the following structure is provided. Namely, the tractor includes an engine hood, engine frames, a lock unit, a release operation unit, and a cover member. In the interior of the engine hood, an engine is arranged. A pair of right and left engine frames are provided and arranged in such a manner as to match their longitudinal directions with a front-rear direction to support the engine. The lock unit deters the engine hood from being opened. The release operation unit is coupled to the lock unit and configured to allow releasing locking of the lock unit through an operation of moving its operable part, the operable part being arranged outward of the engine frames relative to a right-left direction, in a position to be exposed to the exterior. The cover member covers the release operation unit so as to disable manual operation of the release operation unit, while allowing operation of the release operation unit at least by using a predetermined release tool, the cover member having an opening portion shaped along a movement locus of the operable part of the release operation unit.

Covering the release operation unit with the cover member can deter an unintended person from easily unlocking the engine hood. Further, since the release operation unit is arranged on the exterior and outward of the engine frames, an operator can unlock the engine hood in a non-straining posture by using a release tool.

The tractor is preferably structured so that the cover member is constituted by two sheet metal members arranged with a space therebetween, and the release operation unit is arranged between the two sheet metal members.

With use of the sheet metal members, the cover member can be light-weighted and produced at low costs.

The tractor is preferably such that the two sheet metal members respectively have elongated holes constituting the opening portion, in positions corresponding to each other.

With this, the release tool can penetrate through both of the elongated holes in the two sheet metal members, which facilitates the operator to apply a force. Therefore, the lock of the engine hood can be more easily released by using the release tool.

The tractor is preferably structured as follows. Namely, the release operation is an operation of moving the operable part of the release operation unit in a release direction. The release operation unit is constituted by a rod-like member, and the operable part is formed by bending at least a side of the rod-like member toward the release direction in a closed manner.

Since the operation of releasing locking of the lock unit is simple, various tools can be used as the release tool provided that the tool can be inserted into the opening portion. Therefore, user-friendliness can be improved.

The tractor is preferably structured as follows. That is, the tractor includes an attachment plate to which the cover member is detachably mounted using a fixing member. A space above the attachment plate is covered by the engine hood. The fixing member is removable through an operation on a surface of the attachment plate on the interior side of the engine hood, and is not removable through an operation only on a surface of the attachment plate on the exterior side.

By removing the cover member, the lock of the engine hood can be manually released. Therefore, work for opening the engine hood during maintenance becomes easy. Further, since the cover member cannot be removed from the surface on the exterior side, the engine hood cannot be easily unlocked, in a situation such as leaving the tractor outside.

DESCRIPTION OF EMBODIMENTS

Figure 1:
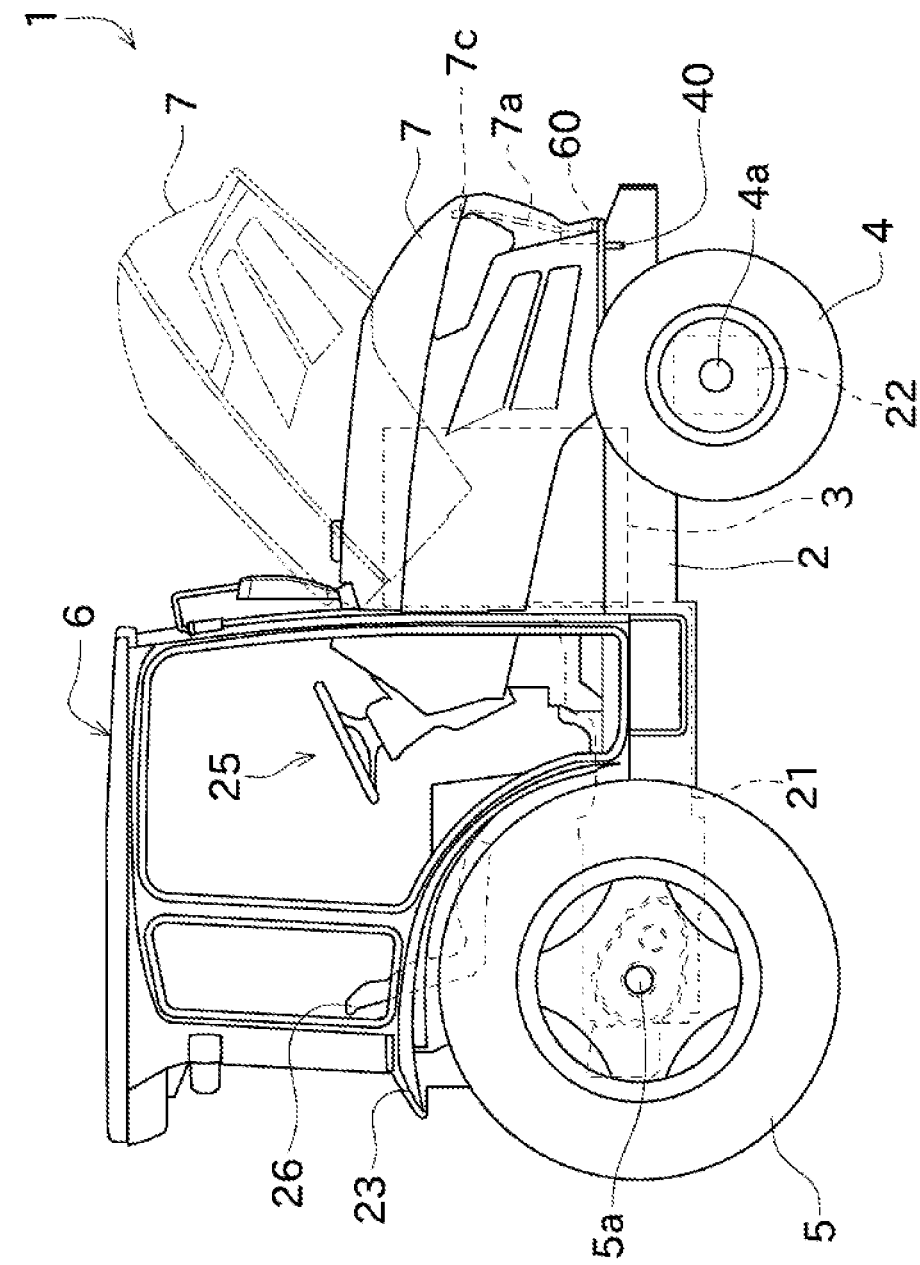
FIG. 1 illustrates a side view showing a structure of a tractor related to one embodiment of the present invention.
Figure 2:
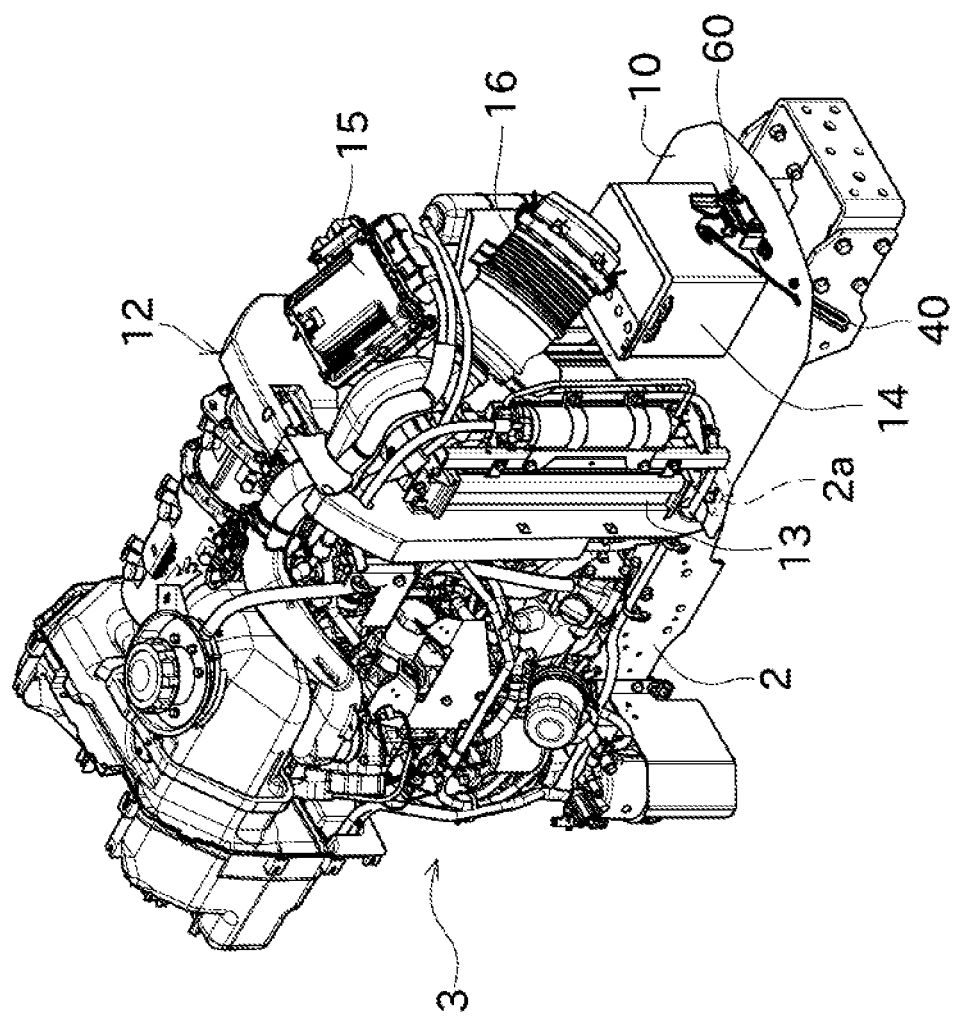
FIG. 2 illustrates a front perspective view showing a structure in the interior of an engine hood.

An embodiment of the present invention will be described with reference to the drawings. FIG. 1 is a side view showing a structure of a tractor 1 related to one embodiment of the present invention. FIG. 2 is a front perspective view showing a structure in the interior of an engine hood 7. In the following description, the wordings "left", "right", and the like mean the left and the right relative to a direction in which the tractor 1 advances, respectively.

The tractor 1 shown in FIG. 1 is capable of being equipped with various work machines such as a plow, a harrow, and a loader to enable various types of work. Front wheels 4 are disposed in a front portion of the tractor 1, and rear wheels 5 are arranged in a rear portion of the tractor 1.

In a front portion of the tractor 1, the engine hood 7 is arranged. In the interior of the engine hood 7, an engine room is structured. The engine hood 7 is deterred from being opened by a lock unit 60 arranged in the interior. Below a front portion of the engine hood 7, an unlock unit 40 is arranged. By operating the unlock unit 40, locking of the lock unit 60 is released (detailed later). By releasing locking of the lock unit 60, the engine hood 7 can be opened and closed by rotating the engine hood 7 about its upper rear end portion as the rotation fulcrum (see dashed-line in FIG. 1). By opening the engine hood 7, an operator can access the engine room and perform maintenance and the like.

As shown in FIG. 1, behind the engine hood 7, a cabin 6 that allows an operator to board is arranged. The cabin 6 has therein an operation unit 25 for performing various operations and a seat 26. The operator of the tractor 1 can perform a traveling operation and the like of the tractor 1 with the operation unit 25.

As shown in FIG. 2, a machine body of the tractor 1 is structured by a pair of engine frames 2 arranged on the right and left sides, respectively, and a transmission case 21 fixed in a rear portion of the engine frames 2. The engine frames 2 are provided and arranged in such a manner as to match their longitudinal directions with a front-rear direction. Further, front portions of the pair of right and left engine frames 2 are joined together. The engine frames 2 support an engine 3 directly or through a vibration isolation member and the like. The engine 3 is a common rail type diesel engine having a plurality of cylinders.

The engine frames 2 have a pair of right and left attachment plate support parts 2a each having a plate-like shape and arranged to face upward (to have its thickness direction match with an up-down direction). In the attachment plate support parts 2a, not-shown attachment holes are formed. On top surfaces of these attachment plate support parts 2a, an attachment plate 10 is attached by using the attachment holes and fixing members such as bolts and nuts. This way, the engine frames 2 (attachment plate support parts 2a) support the attachment plate 10. Further, the attachment plate 10 is attached ahead of a part where the engine 3 is supported. On the attachment plate 10, a fan shroud 12, a radiator 13, a battery 14, an engine controller 15, an air cleaner 16, and a lock unit 60 are arranged directly or through another member.

A front axle case 22 is attached to bottoms of the engine frames 2. To the front axle case 22, front wheels 4 are attached through a front axle shaft 4a. Rear wheels 5 are attached to the transmission case 21 through a rear wheel shaft 5a. The upper sides of the right and left rear wheels 5 are covered by right and left rear fenders 23, respectively.

The transmission case 21 decelerates a driving force from the engine 3 and transmits the force to the front axle case 22 and the rear axle shaft 5a. Operation of a shift lever of a not-shown gear-shift operation device by the operator can change the transmission gear ratio in the transmission case 21 thus adjusting the traveling speed of the tractor 1.

The drive force of the engine 3 is partially transmitted to a PTO shaft (not shown) protruding from the rear end of the transmission case 21. In the tractor 1, the rear end is structured so that the above-mentioned work machine can be attached. The PTO shaft can drive the work machine through a not-shown universal joint and the like.

The thus-configured tractor 1 can perform various types of work such as tillage, seeding, and harvesting, while traveling on a field.

Figure 3:
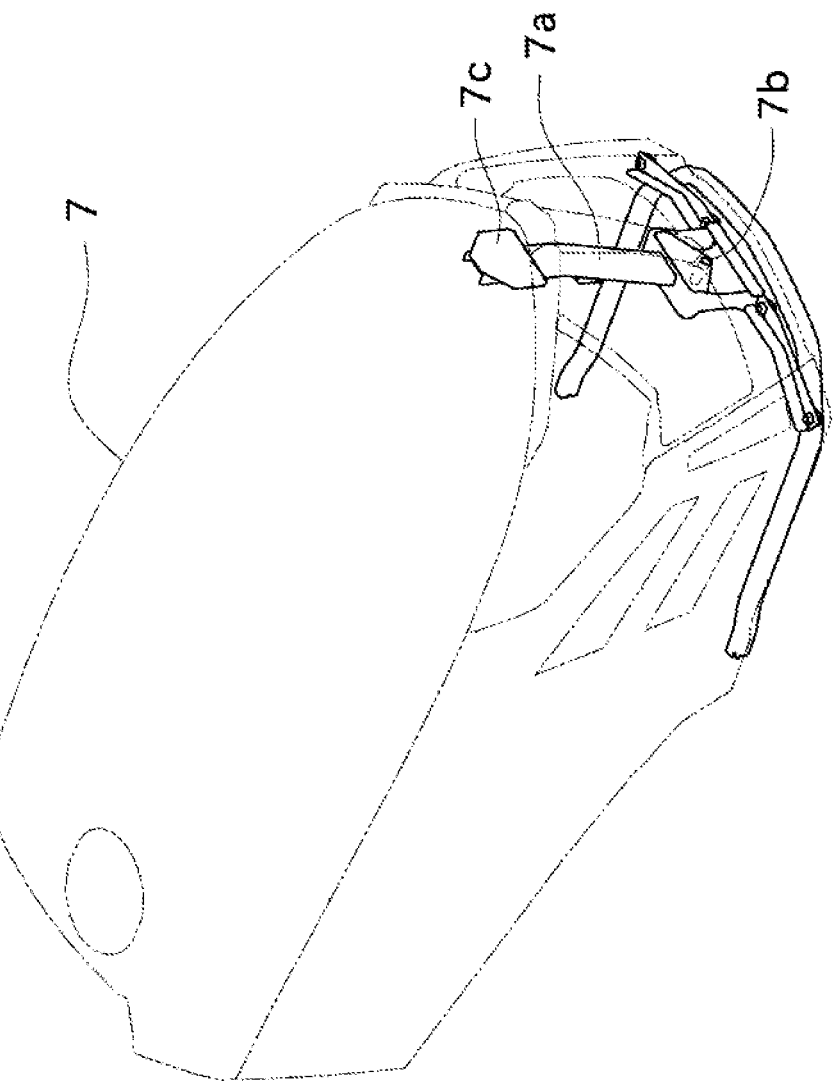
FIG. 3 illustrates a perspective view showing structures of the engine hood and an engine hood frame.
Figure 4:
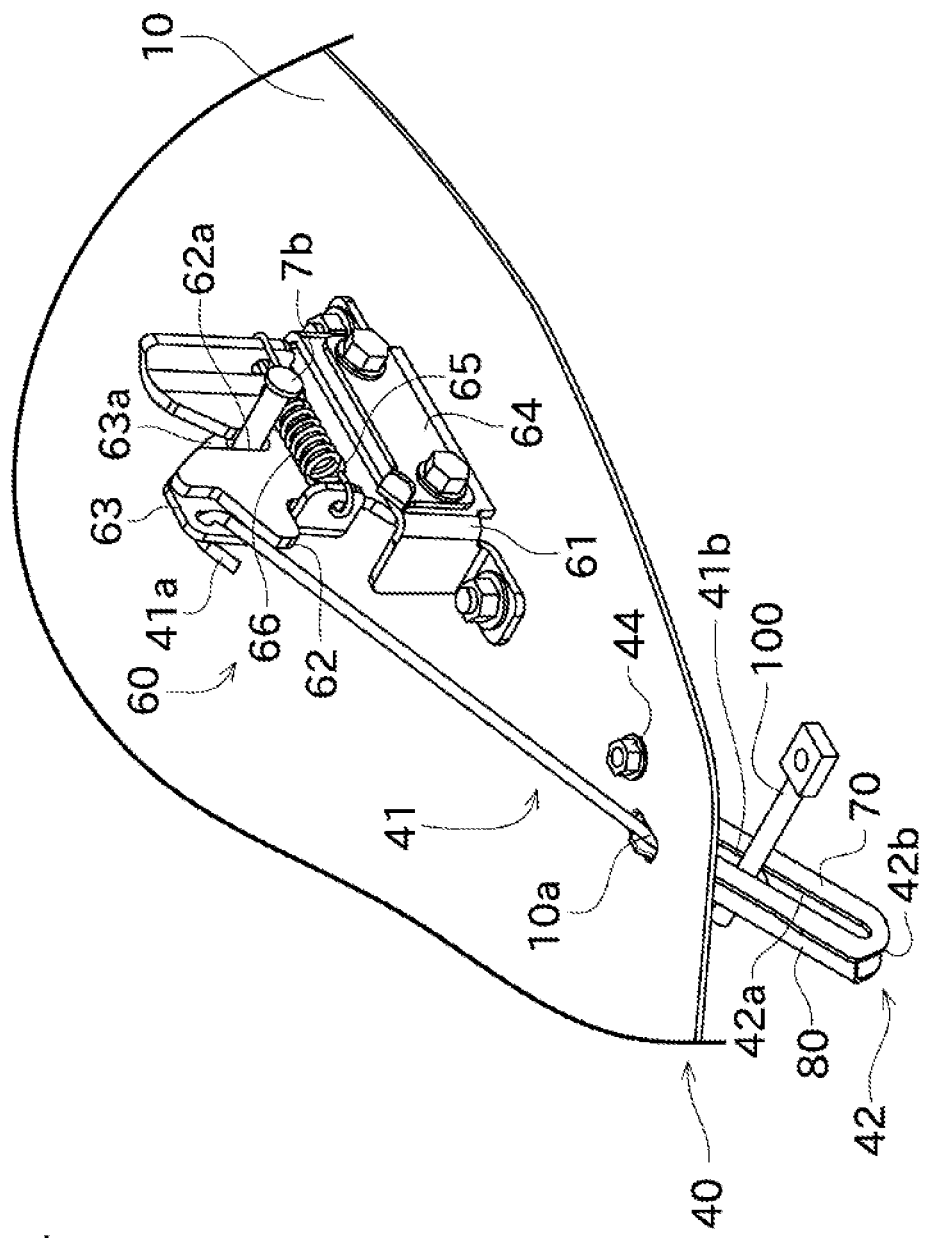
FIG. 4 illustrates a perspective view showing structures of an unlock unit and a lock unit.
Figure 5:
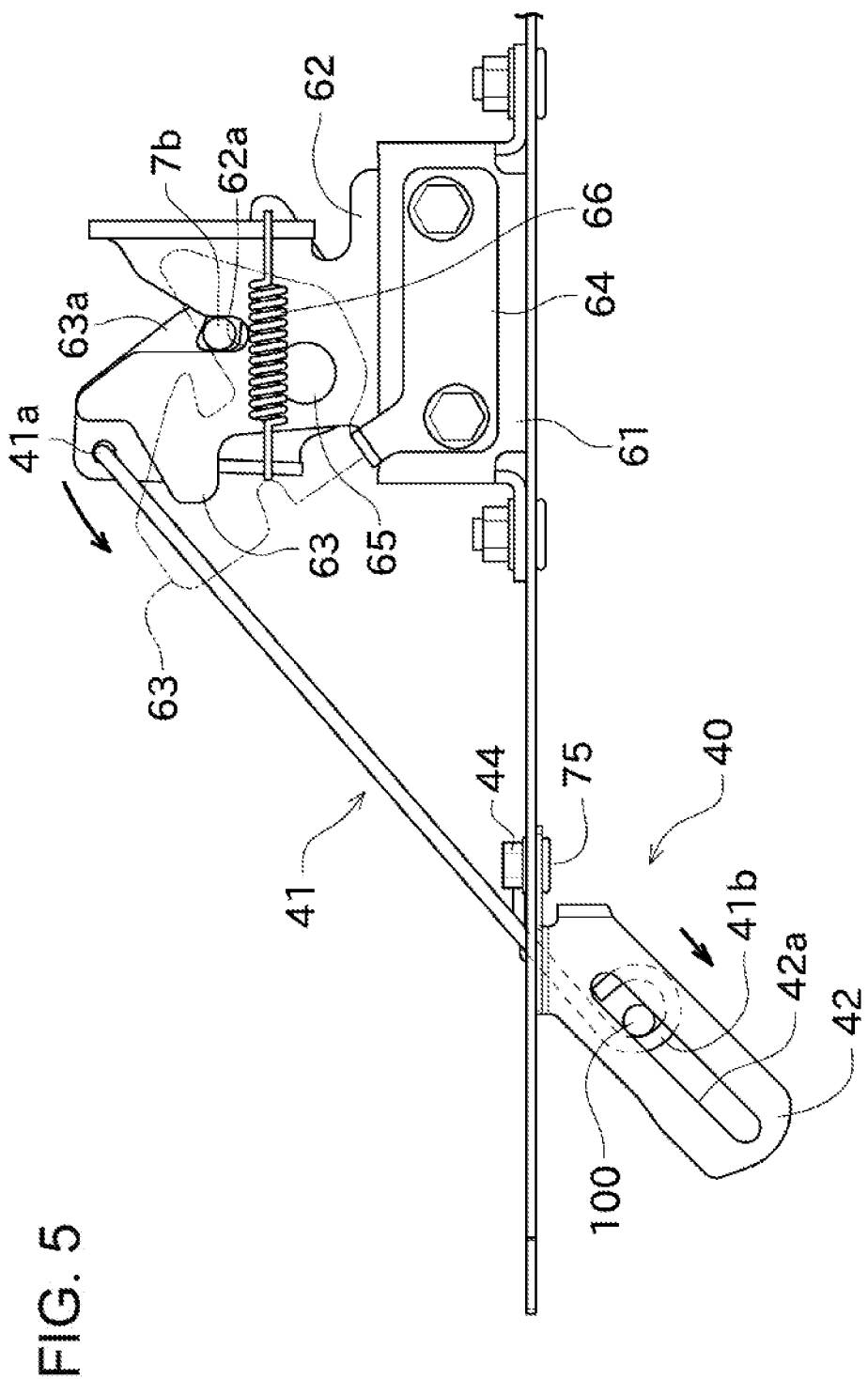
FIG. 5 illustrates a front view showing the structures of the unlock unit and the lock unit.

Next, the following describes structures of the unlock unit 40 and the lock unit 60, with reference to FIG. 2 to FIG. 5. FIG. 3 is a perspective view showing structures of the engine hood 7 and an engine hood frame 7a. FIG. 4 is a perspective view showing the structures of the unlock unit 40 and the lock unit 60. FIG. 5 is a front view showing the structures of the unlock unit 40 and the lock unit 60.

As shown in FIG. 1 and FIG. 3, the engine hood frame 7a is arranged in the interior, and in the front portion, of the engine hood 7. The engine hood frame 7a is a member extending in the up-down direction, and has its upper part connected to a fixing part 7c. The engine hood frame 7a is fixed to an interior wall on the front side of the engine hood 7, by using a not-shown attachment hole formed in the fixing part 7c and a fixing member such as a bolt. Therefore, the engine hood frame 7a integrally rotates with the engine hood 7. Below the engine hood frame 7a, a lock bar 7b is arranged. The lock unit 60 deters the engine hood 7 from being opened by holding the lock bar 7b. Further, the lock unit 60 is arranged in front of the fan shroud 12 to the engine controller 15, and below the air cleaner 16.

First, the structure of the lock unit 60 is described. As shown in FIG. 4 and FIG. 5, the lock unit 60 has a base plate 61, a first lock plate 62, a second lock plate 63, a stopper 64, a rotation pin 65, and a biasing spring 66.

The base plate 61 is attached on an upper surface of the attachment plate 10 (on the interior side of the engine hood 7) by using a fixing member such as a bolt and a nut. The first lock plate 62 is attached to the base plate 61 by using a fixing member such as a bolt and a nut. The first lock plate 62 has a cut-out portion 62a which is open upward. While the lock unit 60 deters the engine hood 7 from being opened, the lock bar 7b is engaged in the cut-out portion 62a. The second lock plate 63 is rotatably attached to the first lock plate 62 by the rotation pin 65. The second lock plate 63 has a closing part 63a which closes an upper portion of the cut-out portion 62a. Further, the first lock plate 62 and the second lock plate 63 are each biased by the biasing spring 66 in a direction such that the upper portion of the cut-out portion 62a is closed by the closing part 63a.

With this structure, the cut-out portion 62a and the closing part 63a hold the lock bar 7b while no external force is applied, and therefore the engine hood 7 is deterred from being opened. Further, the second lock plate 63 has an attachment hole, and an operation wire 41 (an engagement part 41a to be more specific) is engaged with this attachment hole. Pulling the operation wire 41 causes the closing part 63a to rotate in a direction away from the cut-out portion 62a (see a dashed-line of FIG. 5). This releases the lock bar 7b, and therefore the locking of the lock unit 60 is released. It should be noted that, the second lock plate 63 contacts the stopper 64, when rotated by a predetermined amount. Therefore, excessive rotation of the second lock plate 63 can be avoided.

While locking of the lock unit 60 is released, the operator can manually lift the engine hood 7. In the interior of the engine hood 7, there are a plurality of gas dampers which connect a member that rotates along with rotation of the engine hood 7 and a member that does not rotate even when the engine hood 7 rotates. With this, the operator can smoothly open or close the engine hood 7, while locking of the lock unit 60 is released.

Next, the structure of the unlock unit 40 is described. As shown in FIG. 4 and FIG. 5, the unlock unit 40 has the operation wire (release operation unit) 41 and a cover member 42.

The operation wire 41 is a rod-like member and connects the unlock unit 40 to the lock unit 60. The operation wire 41 is arranged so as to penetrate through an insertion hole 10a which is a through hole formed in the attachment plate 10. In other words, a part of the operation wire 41 is arranged in the interior of the engine hood 7, and the remaining part of the operation wire 41 is arranged in the exterior of the engine hood 7. Further, the longitudinal direction of the operation wire 41 and an operation direction of the operation wire 41 extend obliquely toward lower right.

One end portion of the operation wire 41 (an end portion on the interior side of the engine hood 7) is bent to form a hook-like engagement part 41a. The engagement part 41a is engaged with the second lock plate 63, as hereinabove described. The other end portion of the operation wire 41 (an end portion on the side of the exterior of the engine hood 7) is bent to form an annular operable part 41b. The operable part 41b is a part to be operated for releasing locking of the lock unit 60. In the present embodiment, locking of the lock unit 60 is released by moving the operable part 41b to one side (outward) of the operation wire 41 relative to its longitudinal direction. This operation is hereinafter referred to as release operation. Note that the longitudinal direction of the operation wire 41 and a direction in which the operable part 41b is moved do not necessarily have to be strictly the same. Further, in the following description, the direction in which the operable part 41b is moved at the time of release operation is referred to as release direction.

The release operation is assumed to be performed by using a release tool 100, instead of using a hand. As shown in FIG. 4, this release tool 100 has an elongated cylindrical part for operating the operation wire 41 and a hole part to which a keychain and the like is attached. By the operator inserting the cylindrical part of the release tool 100 into the operable part 41b and moving the same in the release direction, locking of the lock unit 60 is released. The operable part 41b is arranged outward of the engine frames 2 (specifically, to the further right of the right engine frame 2) and exposed to the exterior. Since this allows the operator to easily confirm the position of the operable part 41b, the operator can easily release locking of the lock unit 60 by using the release tool 100. Further, since there is no need of inserting the release tool 100 into the interior of the engine hood 7, the operator can release locking of the lock unit 60 in a non-straining posture.

The present embodiment deals with a structure that deters the engine hood 7 from being easily opened by an unintended person, while reducing troubles involved in losing the release tool 100. To more reliably deter the engine hood 7 from being opened by an unintended person, it is preferable to adopt a dedicated release tool (cylinder key and the like). With this structure however, the engine hood 7 cannot be opened, if the dedicated release tool is lost or left in a different place. In this regard, the present embodiment allows unlocking of the engine hood 7 by using a member that can be inserted into the opening portion 42a and that has a certain degree of strength (e.g., a screw driver and the like), instead of using a dedicated release tool. With this, the engine hood 7 can be opened even if the release tool 100 is lost or left at a different place.

Further, since the operable part 41b has an annular shape, its end toward the release direction is closed. This facilitates application of a force in the release direction. Application of a force in the release direction is sufficiently facilitated as long as the end toward the release direction is closed. Since the operation wire 41 is biased in the direction opposite to the release direction by the rotation pin 65, there is no need of an operation to move the operable part 41b in the direction opposite to the release direction, when locking the engine hood 7 (closing the engine hood 7 automatically locks the same). Therefore, the operable part 41b may have a U-shape (specifically, a U-shape with its lower right end, which is on the side toward the release direction, closed) similarly to the engagement part 41a.

The cover member 42 is attached to a lower surface of the attachment plate 10 (exterior side of the engine hood 7). That is, the cover member 42 is arranged downward of the attachment plate 10 (i.e., on the exterior side of the engine hood 7). The cover member 42 is structured to cover the operable part 41b. The cover member 42 has the opening portion 42a which is a through hole. The opening portion 42a is a portion where the release tool 100 is inserted to perform release operation. The opening portion 42a is shaped along the movement locus of the operable part 41b at the time of release operation. Specifically, the opening portion 42a is an elongated hole, and the longitudinal direction thereof substantially matches with the release direction. The cover member 42 therefore also serves as a guide for moving the operation wire 41 in an appropriate direction.

The cover member 42 is a member that deters the operation wire 41 from being easily operated by an unintended person. Specifically, it is a member that deters the engine hood 7 from being easily opened by an unintended person. To this end, the cover member 42 is structured so that the operation wire 41 cannot be operated by a hand, and that the operation wire 41 can be operated by using the release tool 100. Specifically, the diameter of the cylindrical part of the release tool 100 is smaller than the size of a typical finger. A space of the opening portion 42a of the cover member 42 is such that a finger cannot be inserted. Further, a gap 42b is formed at a lower end portion of the cover member 42 relative to the release direction. The size of this gap 42b is also such that a finger cannot be inserted. That is, all the gaps formed in the cover member 42 (gaps that allow access to the operable part 41b) are smaller than the size of a typical finger. Further, the cover member 42 is arranged so that the operation wire 41 (particularly, the engagement part 41a) does not protrude from the cover member 42.

Figure 6:
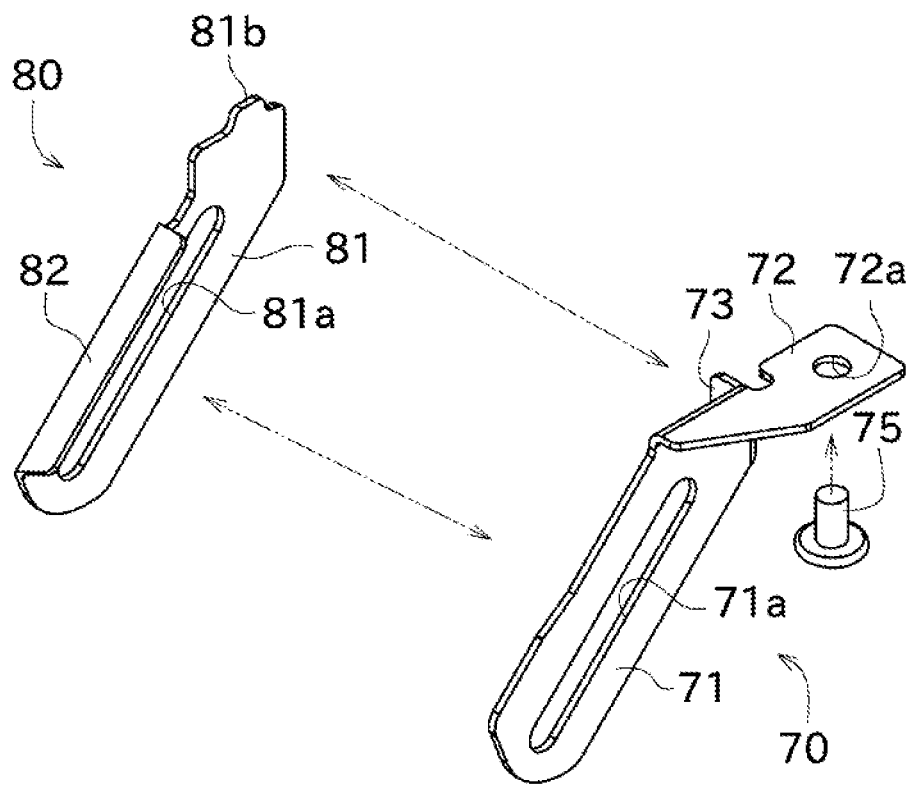
FIG. 6 illustrates an exploded perspective view of a cover member.
Figure 7:
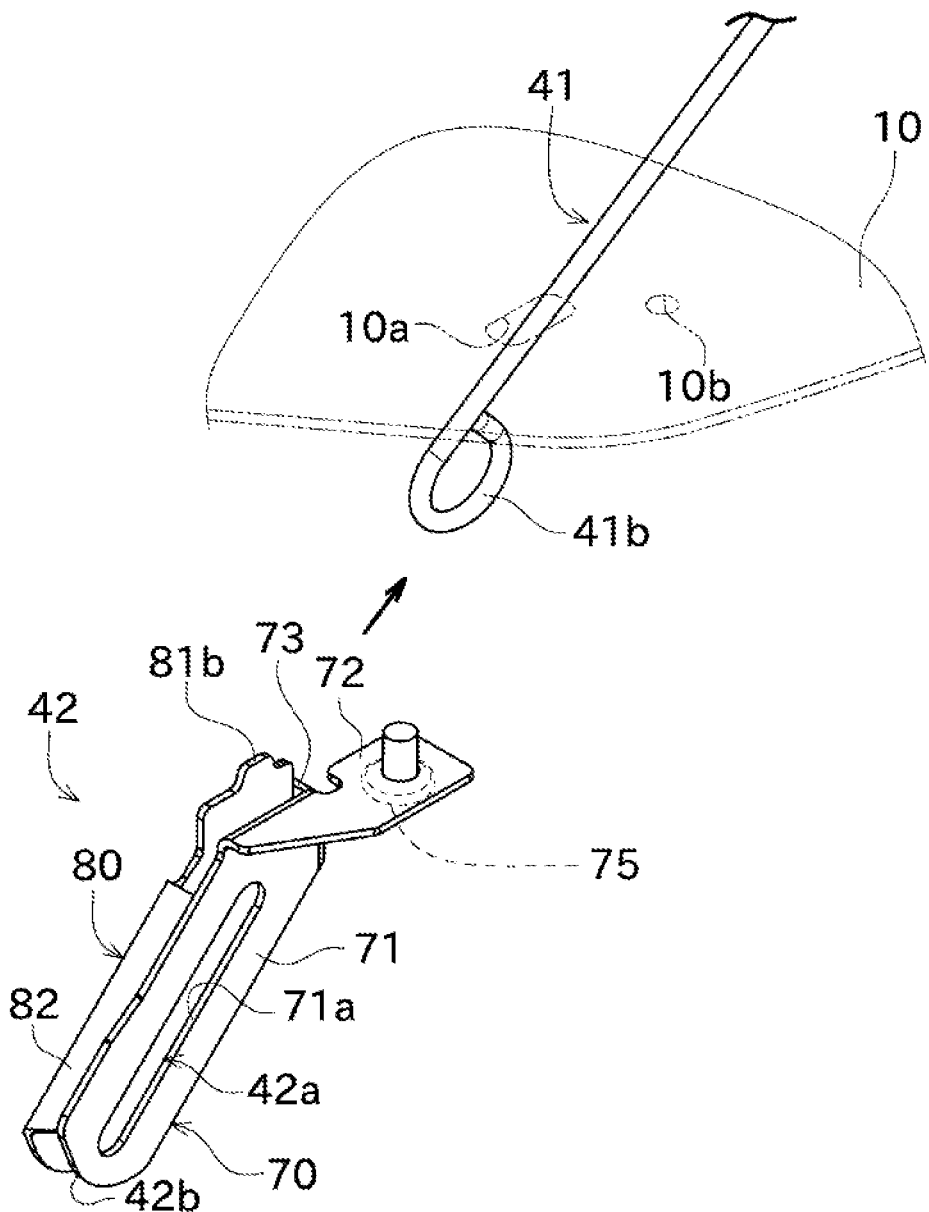
FIG. 7 illustrates a perspective view showing placing of the cover member over an operation wire.
Figure 8:
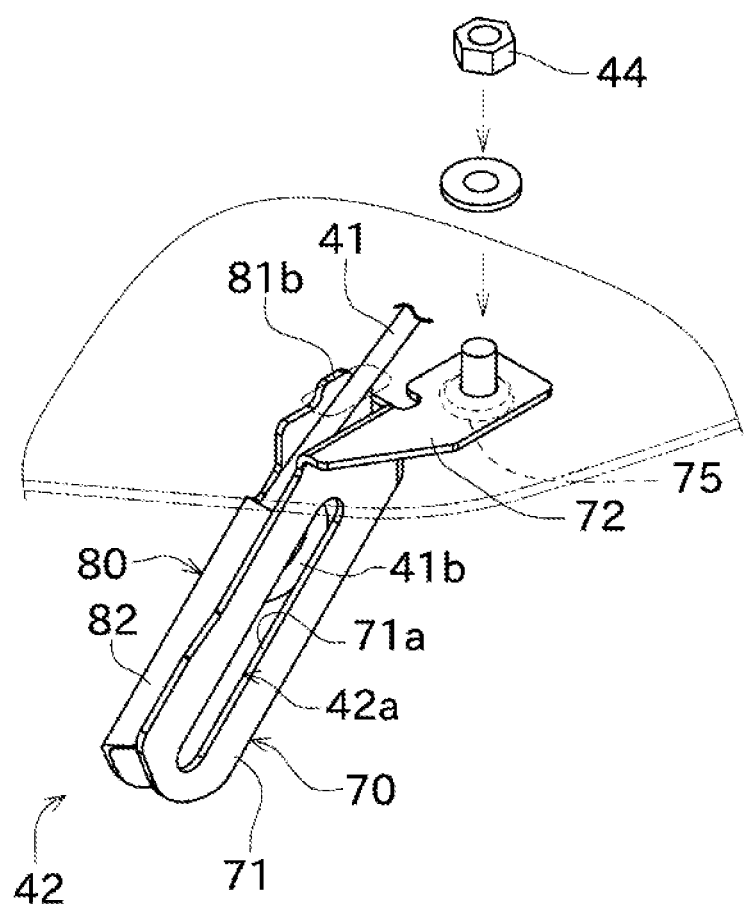
FIG. 8 illustrates a perspective view showing attaching of the cover member to an attachment plate.

Next, the following describes a method of manufacturing the cover member 42, the detailed structure thereof, and a method of attaching the cover member 42. FIG. 6 is an exploded perspective view of the cover member 42. FIG. 7 is a perspective view showing placing of the cover member 42 over the operation wire 41. FIG. 8 is a perspective view showing attaching of the cover member 42 to the attachment plate 10.

As shown in FIG. 6, the cover member 42 is structured by joining a first sheet metal member 70 and a second sheet metal member 80 by welding.

The first sheet metal member 70 has a main part 71, an attaching part 72, and a connection part 73. The main part 71 is an elongated part formed along the longitudinal direction of the operation wire 41. In the main part 71, an elongated hole 71a is formed. The elongated hole 71a is a part of the opening portion 42a, and the elongated hole 71a along with an elongated hole 81a (described later) constitute the opening portion 42a. The attaching part 72 is a part formed by bending so as to substantially parallel to the attachment plate 10. In the attaching part 72, an attachment hole 72a for attachment to the attachment plate 10 is formed. To the lower surface of the attaching part 72, a bolt 75 is connected by welding. Specifically, as shown in FIG. 7, the bolt 75 is inserted into the attachment hole 72a from the lower surface of the attachment plate 10 (the exterior surface of the engine hood 7) so that the head portion is downward, and the head portion is welded to the lower surface of the attachment plate 10. The connection part 73 is a part substantially perpendicular to the main part 71, and is a part to be joined with the second sheet metal member 80, as shown in FIG. 6.

The second sheet metal member 80 has a main part 81 and a connection part 82. The main part 81 is an elongated part formed along the longitudinal direction of the operation wire 41. In the main part 81, the elongated hole 81a and a protruding part 81b are formed. As hereinabove described, the elongated hole 71a and the elongated hole 81a constitute the opening portion 42a which is a through hole. The protruding part 81b is a part that protrudes from the main part 81 toward the attachment plate 10. The protruding part 81b is inserted into the insertion hole 10a for the operation wire 41 received therethrough. The connection part 82 is a part substantially perpendicular to the main part 81, and is a part to be joined with the first sheet metal member 70, as shown in FIG. 6.

As described, by welding the connection part 73 of the first sheet metal member 70 to the main part 81, and welding the connection part 82 of the second sheet metal member 80 to the first sheet metal member 70, the cover member 42 having a substantially box-shape is formed. This way, the main part 71 and the main part 81 are welded to each other so as to be substantially parallel to each other, and to have positions of the elongated hole 71a and the elongated hole 81a corresponding to each other.

Next, the cover member 42 is attached to the attachment plate 10. Specifically, as shown in FIG. 7, the cover member 42 is set so that the operation wire 41 is positioned in the internal space of the cover member 42. Then, as shown in FIG. 8, the attachment hole 10b formed in the attachment plate 10 and the bolt 75 protruding upward from the attachment hole 72a of the first sheet metal member 70 are matched with each other. After this, the bolt 75 protruding upward from the attachment hole 10b is fastened by a nut 44. This way, the cover member 42 is attached to the attachment plate 10.

As should be understood, the cover member 42 is attached by using the bolt 75 and the nut 44. The cover member 42 can be removed by removing the nut 44. For example, at a time of inspection or repairing before shipping of the tractor 1, the cover member 42 is removed. This way, there is no need of using the release tool 100 every time the engine hood 7 is opened (the lock can be released by a hand).

Further, since the nut 44 is arranged in the interior of the engine hood 7 and the bolt 75 is connected by welding, the nut 44 cannot be removed unless locking of the lock unit 60 is released and the engine hood 7 is opened. That is, while making the cover member 42 detachable to improve the operability at the time of inspection and the like, the security is restrained from being deteriorated because an unintended person cannot remove the cover member 42. The bolt 75 is a low head bolt, but may be a bolt of a different type. Further, the bolt 75 does not have to be welded to the attachment plate 10.

Regarding the members arranged around the nut 44: the engine hood 7 is arranged on the front side, above, and the right and left sides of the nut 44. Below the nut 44, the attachment plate 10 is arranged. Behind the nut 44, the fan shroud 12 to battery 14 are arranged as shown in FIG. 2. As should be understood from this, the nut 44 cannot be accessed unless the engine hood 7 is opened.

As hereinabove described, the tractor 1 of the present embodiment includes an engine hood 7, engine frames 2, a lock unit 60, an operation wire 41, and a cover member 42. In the interior of the engine hood 7, an engine 3 is arranged. A pair of right and left engine frames 2 are provided and arranged in such a manner as to match their longitudinal directions with the front-rear direction to support the engine 3. The lock unit 60 deters the engine hood 7 from being opened. The operation wire 41 is coupled to the lock unit 60, and is configured to allow releasing locking of the lock unit 60 through a release operation of moving its operable part 41b. The operable part 41b is arranged outward of the engine frames 2 relative to the right-left direction and exposed to the exterior. The cover member 42 covers the operation wire 41 so as to disable manual operation of the operation wire 41, while allowing operation of the operation wire 41 at least by using a predetermined release tool 100, the cover member 42 having an opening portion 42a shaped along a movement locus of the operable part 41b of the operation wire 41.

Covering the operation wire 41 with the cover member 42 can deter an unintended person from easily unlocking the engine hood 7. Further, since the operation wire 41 is arranged on the exterior and outward of the engine frames 2, an operator can unlock the engine hood 7 in a non-straining posture by using a release tool 100.

The tractor 1 of the present embodiment is structured so that the cover member 42 is constituted by a first sheet metal member 70 and a second sheet metal member 80 arranged with a space therebetween, and the operation wire 41 is arranged between the first sheet metal member 70 and the second sheet metal member 80.

With use of the sheet metal members, the cover member 42 can be light-weighted and produced at low costs.

The tractor 1 of the present embodiment is such that the first sheet metal member 70 and the second sheet metal member 80 respectively have elongated holes 71a and 81a constituting the opening portion 42a, in positions corresponding to each other.

With this, the release tool 100 can penetrate through both of the elongated holes 71a and 81a in the first sheet metal member 70 and the second sheet metal member 80, which facilitates the operator to apply a force. Therefore, the lock of the engine hood 7 can be more easily released by using the release tool 100.

In the tractor 1 of the present embodiment, the release operation is an operation of moving the operable part 41b of the operation wire 41b in the release direction. The operation wire 41 is constituted by a rod-like member, and the operable part 41b is formed by bending at least a side of the rod-like member toward the release direction in a closed manner.

Since the operation of releasing locking of the lock unit 60 is simple, various tools can be used as the release tool provided that the tool can be inserted into the opening portion 42a. Therefore, user-friendliness can be improved.

Further, the tractor 1 of the present embodiment includes an attachment plate 10 to which the cover member 42 is detachably mounted using a nut 44. A space above the attachment plate 10 is covered by the engine hood 7. The nut 44 is removable through an operation on a surface of the attachment plate 10 on the interior side of the engine hood 7, and is not removable through an operation only on a surface of the attachment plate 10 on the exterior side.

By removing the cover member 42, the lock of the engine hood 7 can be manually released. Therefore, work for opening the engine hood 7 during maintenance becomes easy. Further, since the cover member 42 cannot be removed from the surface on the exterior side, the engine hood 7 cannot be easily unlocked, in a situation such as leaving the tractor 1 outside.

Although a preferred embodiment of the present invention has been described above, the above-described configuration can be modified, for example, as follows.

In the above embodiment, the unlock unit 40 is attached to the surface of the attachment plate 10 on the side opposite to the lock unit 60 is mounted. However, the unlock unit 40 may be attached to another member (a member different from the one where the lock unit 60 is attached), provided that the unlock unit 40 is connected by the operation wire 41 and the like.

In the above embodiment, the unlock unit 40 is detachably structured. However, the unlock unit 40 may be joined to the attachment plate 10 by welding and the like so as to be undetachable.

In the above embodiment, the release operation is such that the operable part 41b is moved (pulled) in a direction away from the lock unit 60 (engine hood 7). However, the release operation may be such that the operable part 41b is moved (pushed) towards the lock unit 60. Further, the release operation is not limited to an operation that involves a movement in one direction. For example, the release operation may involve a movement in a first direction, followed by a movement in a second direction which is different from the first direction. In this case, the opening portion of the cover member also includes a portion shaped along the first direction and a portion shaped along the second direction.

In the above embodiment, the lock unit 60 is arranged nearby a front end portion of the engine hood 7; however, may be arranged in a different position (e.g., nearby an upper end portion of the engine hood 7).

The tractor 1 of the above embodiment is of a type having the cabin 6 covering the operation unit 25 and the seat 26. However, the present invention is also applicable to a tractor whose operation unit and seat are not covered by the cabin (exposed to the exterior).

REFERENCE SIGNS LIST 1 tractor
2 engine frame
3 engine
5 rear wheel
40 unlock unit
41 operation wire (release operation unit)
42 cover member
75 bolt
44 nut (fixing member)
60 lock unit

The invention claimed is:

1. A tractor comprising:
an engine hood configured to cover an engine;
a lock unit configured to deter the engine hood from being opened;
a release operation unit configured to allow releasing of locking of the lock unit; and
wherein:
the release operation unit is arranged in a position to be exposed to exterior of a machine body of the tractor; and
a cover member covering the release operation unit is provided, the cover member having an opening portion shaped along a movement locus of an operable part of the release operation unit.

2. The tractor according to claim 1, wherein the opening portion is formed in an elongated shape.

3. The tractor according to claim 1, wherein:
a release operation for releasing locking of the lock unit is an operation of moving the operable part of the release operation unit in a release direction; and
the release operation unit is constituted by a rod-like member, and the operable part is formed by bending at least a side of the rod-like member toward the release direction in a closed manner.

4. The tractor according to claim 1, further comprising:
an attachment plate to which the cover member is detachably mounted using a fixing member, wherein:
a space above the attachment plate is covered by the engine hood; and
the fixing member is removable through an operation on a surface of the attachment plate on an interior side of the engine hood, and is not removable through an operation only on a surface of the attachment plate on an exterior side of the engine hood.

5. The tractor according to claim 1, wherein the release operation unit is configurable into a first state and a second state, the first state corresponding to the engine hood being deterred from being opened, the second state corresponding to the engine hood being released.

6. The tractor according to claim 1, further comprising an engine frame including a first portion and a second portion, the engine frame configured to support the engine, each of the first portion and the second portion having a longitudinal direction parallel with a longitudinal direction of a front to rear direction of the tractor.

7. The tractor according to claim 6, wherein the release operation unit is positioned outside of an area defined by the engine frame.

8. The tractor according to claim 1, wherein the release operation unit is coupled to the lock unit.

9. The tractor according to claim 1, wherein the cover member is configured to enable operation of the release operation unit via a release tool.

10. The tractor according to claim 1, wherein the cover member includes a first sheet metal member and a second sheet metal member.

11. The tractor according to claim 10, wherein the release operation unit is positioned between the first sheet metal member and the second sheet metal member.

12. The tractor according to claim 10, wherein the first sheet metal member includes a first hole defining a first portion of the opening portion and the second sheet metal member includes a second hole defining a second portion the opening portion, the second hole positioned opposite the first hole.

13. The tractor according to claim 12, wherein the first hole is a first elongated hole and the second hole is a second elongated hole.

14. The tractor according to claim 13, wherein the first elongated hole is oblong shaped and the second elongated hole is oblong shaped.

15. The tractor according to claim 1, wherein the operable part of the release operation unit is configured to move within a region defined by the opening portion of the cover member.

16. The tractor according to claim 1, wherein the operable part of the release operation unit is configured to move in a first direction and a predetermined release tool is configured to be received by the opening portion of the cover member from a second direction, the second direction different from the first direction.

17. The tractor according to claim 1, wherein:
the operable part of the release operating unit is configured to receive a predetermined release tool through the operable part; and
the opening portion of the cover member is configured to receive the predetermined release tool through the opening portion.

18. The tractor according to claim 1, wherein the cover member includes a first metal sheet defining a first hole and a second metal sheet defining a second hole, the first hole and the second hole defining the opening portion.

19. A tractor comprising:
an engine hood configured to cover an engine;
a pair of right and left engine frames arranged in such a manner as to match longitudinal directions of a front-rear direction of the tractor to support the engine;
a lock unit configured to deter the engine hood from being opened;
a release operation unit coupled to the lock unit and configured to allow releasing of locking of the lock unit through an operation of moving an operable part of the release operation unit, the operable part being arranged outward of the engine frames relative to a right-left direction, in a position to be exposed to exterior of the engine frames; and
a cover member covering the release operation unit so as to disable a manual operation of the release operation unit, while allowing an operation of the release operation unit at least by using a predetermined release tool, the cover member having an opening portion shaped along a movement locus of the operable part of the release operation unit; and
wherein:
the cover member is constituted by two sheet metal members arranged with a space therebetween, and
the release operation unit is arranged between the two sheet metal members.

20. The tractor according to claim 19, wherein each of the two sheet metal members includes a hole defining a portion of the opening portion.

* * * * *